US012023526B2

(12) United States Patent
Schroder

(10) Patent No.: US 12,023,526 B2
(45) Date of Patent: Jul. 2, 2024

(54) ESCAPE SYSTEMS FOR DESCENDING A PERSON FROM A WINDOW

(71) Applicant: Pella Corporation, Pella, IA (US)

(72) Inventor: Paul Schroder, Pella, IA (US)

(73) Assignee: Pella Corporation, Pella, IA (US)

( * ) Notice: Subject to any disclaimer, the term of this patent is extended or adjusted under 35 U.S.C. 154(b) by 528 days.

(21) Appl. No.: 17/114,935

(22) Filed: Dec. 8, 2020

(65) Prior Publication Data

US 2021/0228915 A1 Jul. 29, 2021

Related U.S. Application Data

(60) Provisional application No. 62/964,917, filed on Jan. 23, 2020.

(51) Int. Cl.

| | |
|---|---|
| ***A62B 1/08*** | (2006.01) |
| *E06B 3/32* | (2006.01) |
| *E06B 3/36* | (2006.01) |

(52) U.S. Cl.

CPC ................ *A62B 1/08* (2013.01); *E06B 3/325* (2013.01); *E06B 3/36* (2013.01)

(58) Field of Classification Search

CPC .... A62B 1/08; A62B 1/04; A62B 1/10; A62B 1/20; A62B 3/325; A62B 3/36; A62B 7/28; E06B 3/325; E06B 3/36; E06B 7/28

See application file for complete search history.

(56) References Cited

U.S. PATENT DOCUMENTS

| | | | | |
|---|---|---|---|---|
| 28,551 A * | 6/1860 | Avery | A62B 1/10 | 182/236 |
| 56,417 A * | 7/1866 | Horne | A62B 1/10 | 182/236 |
| 116,659 A * | 7/1871 | Ale | E06C 9/14 | 182/116 |
| 170,270 A * | 11/1875 | Jingras | A62B 1/10 | 182/240 |
| 200,870 A * | 3/1878 | Moore | A62B 1/10 | 182/235 |
| 245,334 A * | 8/1881 | Wolff | A62B 1/10 | 182/241 |
| 261,584 A * | 7/1882 | Coller | A62B 1/10 | 182/240 |

(Continued)

FOREIGN PATENT DOCUMENTS

| | | |
|---|---|---|
| CN | 201883885 U | 6/2011 |
| CN | 102151369 A | 8/2011 |

(Continued)

*Primary Examiner* — Jessica L Laux
*Assistant Examiner* — Kathleen M. McFarland
(74) *Attorney, Agent, or Firm* — Armstrong Teasdale LLP

(57) ABSTRACT

An escape system for descending a person from a window is disclosed. The escape system may be mounted above a window through which a person may egress and descend to the ground. The escape system includes a fenestration unit having a frame and a human support embedded into the frame in a stowed position. The human support carries a person during descent. A cable is wound about a shaft supported by the frame. The cable is connected to the human support. The escape system further includes a speed limiting device connected to the shaft that controls the speed of descent.

14 Claims, 8 Drawing Sheets

(56) References Cited

U.S. PATENT DOCUMENTS

| | | | | | | |
|---|---|---|---|---|---|---|
| 276,969 | A | * | 5/1883 | Hitchcock | A62B 1/08 | 182/75 |
| 321,212 | A | * | 6/1885 | Hargrave, Sr. et al. | A62B 1/10 | 182/72 |
| 324,670 | A | * | 8/1885 | Doolittle | A62B 1/10 | 182/234 |
| 358,666 | A | * | 3/1887 | Holland | A62B 1/10 | 182/236 |
| 493,490 | A | * | 3/1893 | Felt | A62B 1/10 | 182/234 |
| 580,852 | A | * | 4/1897 | Edgington et al. | A62B 1/10 | 182/240 |
| 631,382 | A | * | 8/1899 | Rees | A62B 1/10 | 188/188 |
| 648,762 | A | * | 5/1900 | Kurre et al. | A62B 1/10 | 182/237 |
| 650,733 | A | * | 5/1900 | Shaw | A62B 1/10 | 294/67.4 |
| 696,931 | A | * | 4/1902 | Boettcher | A62B 1/10 | 188/77 R |
| 701,094 | A | * | 5/1902 | Setbacken et al. | A62B 1/10 | 188/186 |
| 2,452,324 | A | * | 10/1948 | Francis | A62B 1/10 | 182/236 |
| 2,500,884 | A | * | 3/1950 | Tessin | A62B 1/10 | 182/240 |
| 2,518,934 | A | * | 8/1950 | Renner | A62B 1/10 | 242/396.9 |
| 2,526,065 | A | * | 10/1950 | Chodacki | A62B 1/08 | 182/236 |
| 2,561,832 | A | * | 7/1951 | Wilson | A62B 1/10 | 182/72 |
| 3,692,145 | A | * | 9/1972 | Banner | E06C 9/14 | 182/78 |
| 3,871,480 | A | * | 3/1975 | Sauri | A62B 1/02 | 182/100 |
| 3,880,255 | A | * | 4/1975 | Huntley | A62B 1/10 | 182/5 |
| 3,893,541 | A | * | 7/1975 | Servais | A62B 1/10 | 182/238 |
| 4,145,027 | A | * | 3/1979 | Brimo | A62B 1/10 | 182/193 |
| 4,237,654 | A | * | 12/1980 | Landem | A62C 2/247 | 49/164 |
| 4,286,690 | A | * | 9/1981 | Gastine | A62B 1/08 | 182/5 |
| 4,432,437 | A | * | 2/1984 | McClung | A62B 1/10 | 182/236 |
| 4,445,589 | A | * | 5/1984 | Longenecker | E06C 9/14 | 49/141 |
| 4,473,132 | A | * | 9/1984 | Schwing | A62B 1/08 | 182/233 |
| 4,503,933 | A | * | 3/1985 | O'Neil | A62B 1/08 | 182/236 |
| 4,640,388 | A | * | 2/1987 | Walborn | A62B 1/10 | 182/231 |
| 4,671,384 | A | * | 6/1987 | Sing | A62B 1/10 | D29/124 |
| 4,705,141 | A | * | 11/1987 | Splaine | A62B 1/20 | 182/100 |
| 4,781,269 | A | * | 11/1988 | Clay | A62B 1/12 | 182/71 |
| 4,879,842 | A | * | 11/1989 | Bailey | E05B 65/1033 | 49/141 |
| 4,919,231 | A | * | 4/1990 | Klokseth | A62B 1/10 | 188/65.1 |
| 5,020,633 | A | * | 6/1991 | Rangel | E06C 9/14 | 182/100 |
| 5,064,021 | A | * | 11/1991 | Bauer | A62B 1/18 | 182/100 |
| 5,343,981 | A | * | 9/1994 | Schroemges | A62B 1/10 | 182/71 |
| 5,467,841 | A | * | 11/1995 | Krumal | E06C 9/14 | 182/198 |
| 6,102,155 | A | * | 8/2000 | Hood | A62B 1/00 | 182/198 |
| 6,550,580 | B1 | * | 4/2003 | Roches | E06B 7/28 | 182/5 |
| 6,955,244 | B2 | * | 10/2005 | Yerman | A62B 1/10 | 182/7 |
| 6,988,587 | B1 | * | 1/2006 | Smith | A62B 1/10 | 182/71 |
| 7,004,287 | B1 | * | 2/2006 | Barbara | E06B 7/28 | 182/76 |
| 7,104,492 | B1 | * | 9/2006 | Massell | B66D 1/36 | 242/615.3 |
| 7,703,576 | B2 | * | 4/2010 | Grabowski | A62B 35/0062 | 182/36 |
| 8,162,105 | B1 | * | 4/2012 | Ohland | A62B 5/00 | 182/74 |
| 9,056,210 | B2 | * | 6/2015 | White | A62B 1/20 | |
| 10,065,053 | B2 | * | 9/2018 | Verstegen | A62B 1/08 | |
| 2004/0108163 | A1 | * | 6/2004 | Johnson | E06C 9/14 | 182/70 |
| 2006/0163000 | A1 | * | 7/2006 | Chowthi | A62B 1/08 | 182/72 |
| 2007/0284188 | A1 | * | 12/2007 | Chippindale | A62B 1/20 | 182/48 |
| 2008/0029338 | A1 | * | 2/2008 | Rosal | A62B 1/06 | 182/70 |
| 2008/0314685 | A1 | * | 12/2008 | Verstegen | A62B 1/10 | 182/231 |
| 2012/0160606 | A1 | * | 6/2012 | Barbara | E06B 7/28 | 182/93 |
| 2014/0291070 | A1 | * | 10/2014 | White | A62B 1/20 | 182/48 |
| 2015/0014097 | A1 | * | 1/2015 | Chang | A62B 1/10 | 182/236 |
| 2016/0175622 | A1 | * | 6/2016 | Verstegen | A62B 1/10 | 254/274 |
| 2017/0007857 | A1 | * | 1/2017 | Meng | A62B 1/10 | |

FOREIGN PATENT DOCUMENTS

| | | | |
|---|---|---|---|
| CN | 103830851 | A | 6/2014 |
| CN | 104922815 | A | 9/2015 |
| CN | 106310546 | A | 1/2017 |
| CN | 106563214 | A | 4/2017 |
| CN | 107050676 | A | 8/2017 |
| CN | 107376136 | A | 11/2017 |
| CN | 107670186 | | 2/2018 |
| CN | 109157771 | A | 1/2019 |
| CN | 109350872 | A | 2/2019 |
| CN | 110101981 | A | 8/2019 |
| EP | 87650 | A2 | 11/1983 |
| FR | 2387660 | A1 | 11/1978 |
| GB | 1186157 | A | 2/1969 |
| KR | 20140111909 | A | 9/2014 |
| KR | 101542597 | B1 | 8/2015 |
| WO | 1988004561 | A1 | 6/1988 |
| WO | 2013049973 | A1 | 4/2013 |

* cited by examiner

ESCAPE SYSTEMS FOR DESCENDING A PERSON FROM A WINDOW

CROSS-REFERENCE TO RELATED APPLICATION

This application claims the benefit of U.S. Provisional Patent Application No. 62/964,917, filed Jan. 23, 2020, which is incorporated herein by reference in its entirety.

FIELD OF THE DISCLOSURE

The field of the disclosure relates to escape systems for descending a person from a window and, more specifically, escape systems that may be embedded into a window fenestration unit.

BACKGROUND

During structure fires and/or earthquakes, persons may become trapped in the upper stories of a building or home. At least some known escape systems have been developed to aid a person in escaping by enabling a person to reach the ground through a window.

Conventional escape systems are not integrated with a window and are typically stowed out of the way until needed, i.e., stored in a closet or under a bed. As such, these escape systems may not be readily accessible during a fire or earthquake. For example, a person may find it difficult to locate the escape system. Additionally, these escape systems may also require the person to assemble and/or mount the escape system prior to use. For example, the escape system may need to be secured to a structure, such as a window sill, before descent. Locating and properly assembling and/or mounting the escape system may be difficult and time consuming.

A need exists for window escape system that may be readily deployed and for systems that are easily accessible and/or integrated into the window or the window fenestration unit.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an escape system for descending a person from a window. The escape system includes a fenestration unit having a frame. A human support is embedded into the frame in a stowed position. The human support is configured to carry a person during descent. A cable is wound about a shaft supported by the frame. The cable is connected to the human support. A speed limiting device is connected to the shaft for controlling the speed of descent of the human support.

Another aspect of the present disclosure is directed to an escape system for descending a person from a window. The escape system includes a fenestration unit having a frame. A human support is configured to carry a person during descent. A cable is wound about a shaft. The cable is connected to the human support. A non-powered speed limiting device is connected to the shaft for controlling the speed of descent of the human support.

Yet another aspect of the present disclosure is directed to an escape window system. The escape window system includes a fenestration unit and a human support configured to carry a person during descent. A cable is connected to the human support for lowering the human support from the fenestration unit. A speed limiting device is connected to the shaft for controlling the speed of descent of the human support. A window is moveable between a closed position and an open position. The window has an egress opening in the open position. The escape window system includes a release device. The human support is lowered from the fenestration unit when the release device is activated such that the human support is vertically aligned with the egress opening.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
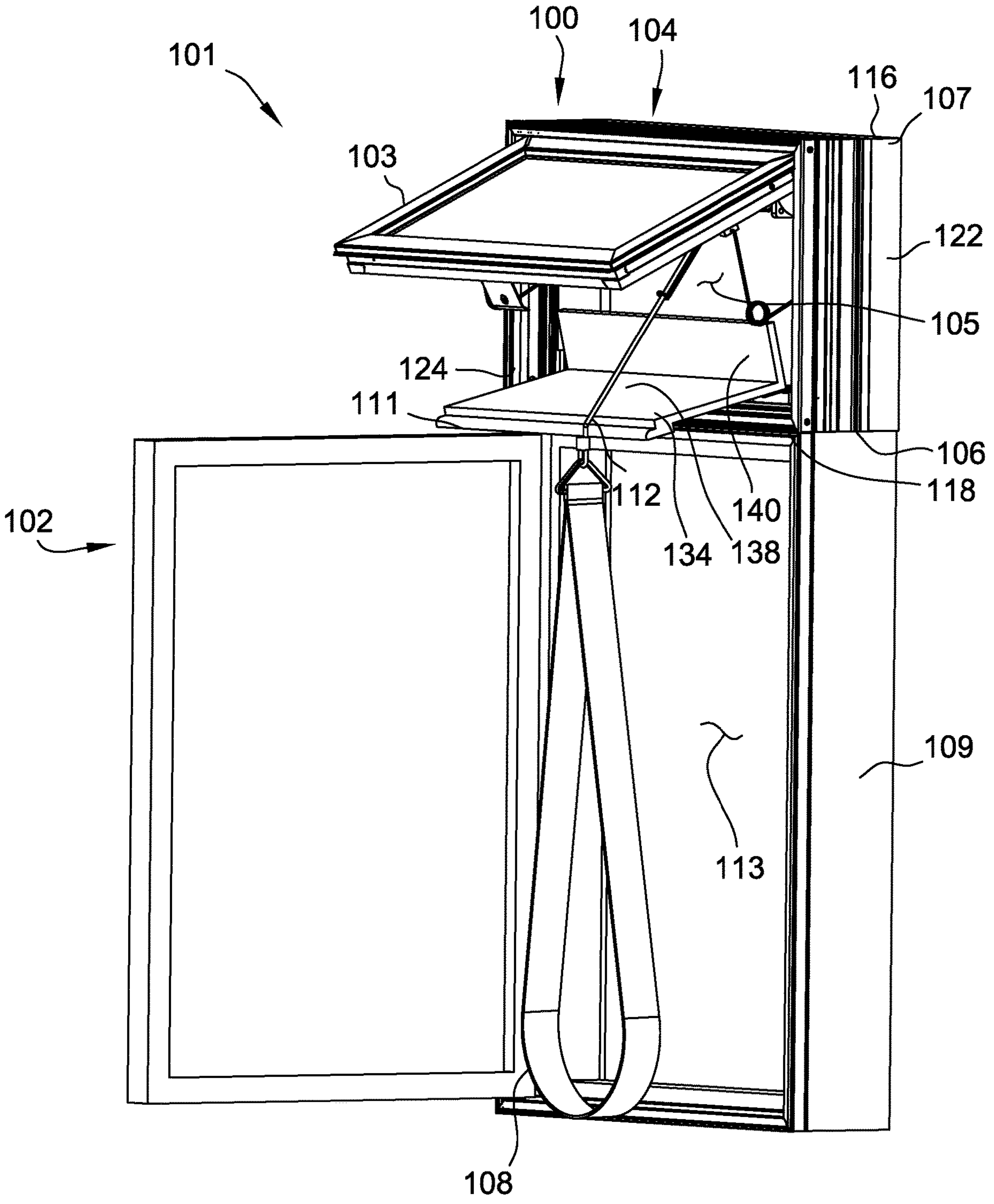
FIG. 1 is a front perspective view of an embodiment of an escape system in an open position for descending a person from a window.

An example embodiment of an escape system 100 for descending a person from a building is shown in FIGS. 1-5. The example escape system 100 may be mounted above a window 102. The escape system 100 enables a person to egress through the window opening 113 and descend to the ground. The escape system 100 includes a fenestration unit 104 mounted above the window 102 which includes a frame 106 that defines an opening 105 covered by a door 103. The escape system 100 includes a human support 108 (e.g., harness) for lowering a person from the window 102. The human support 108 may be embedded in the frame 106 in a stowed position (FIG. 4) when not being used. The escape system 100 may be deployed by opening the door 103 and rotating a shelf 134 outward to release the human support 108 and move the human support 108 to a lowered position (FIG. 1) as further described below.

Figure 2:
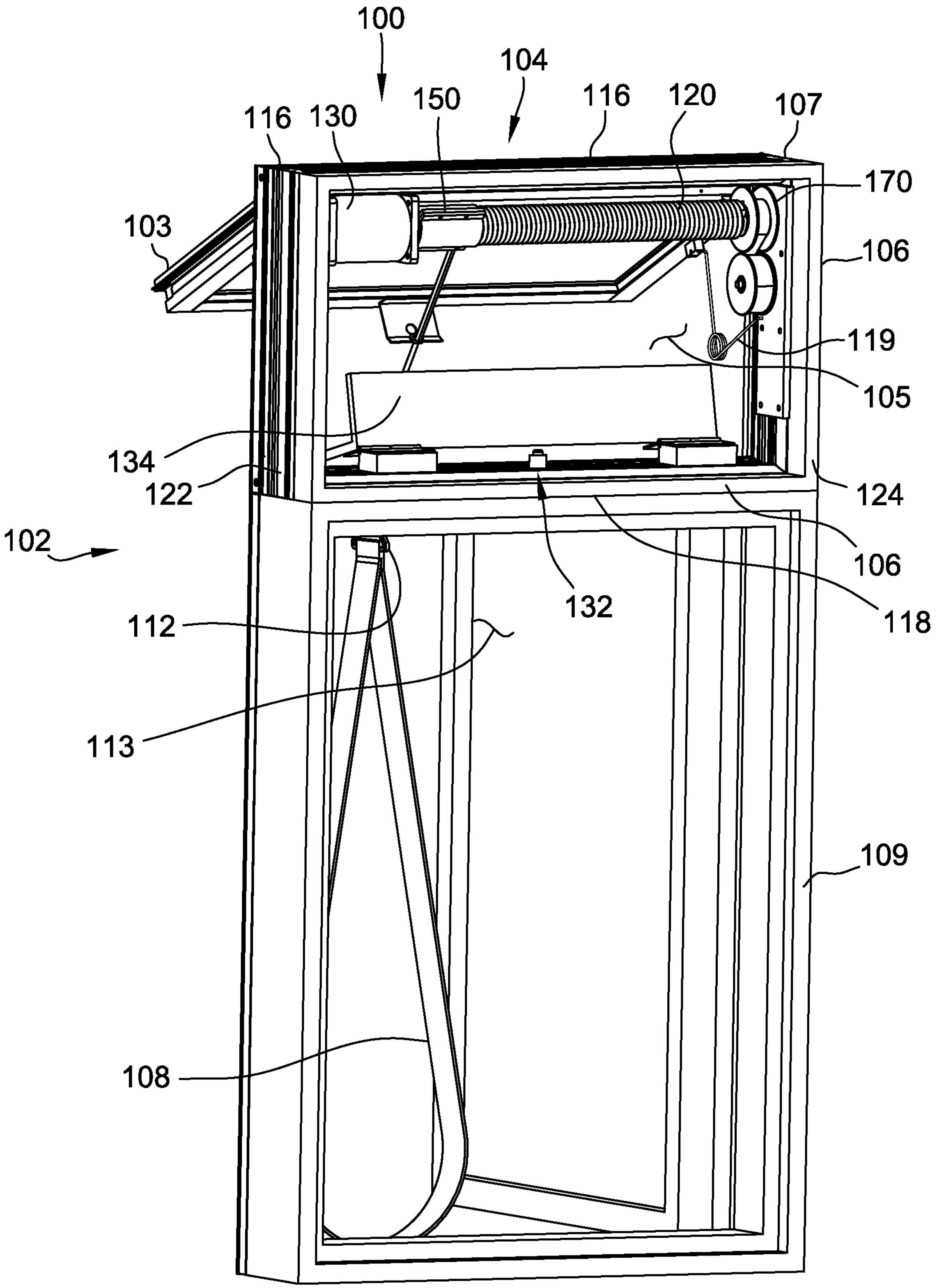
FIG. 2 is a rear perspective view the escape system in the open position with a rear cover removed.
Figure 3:
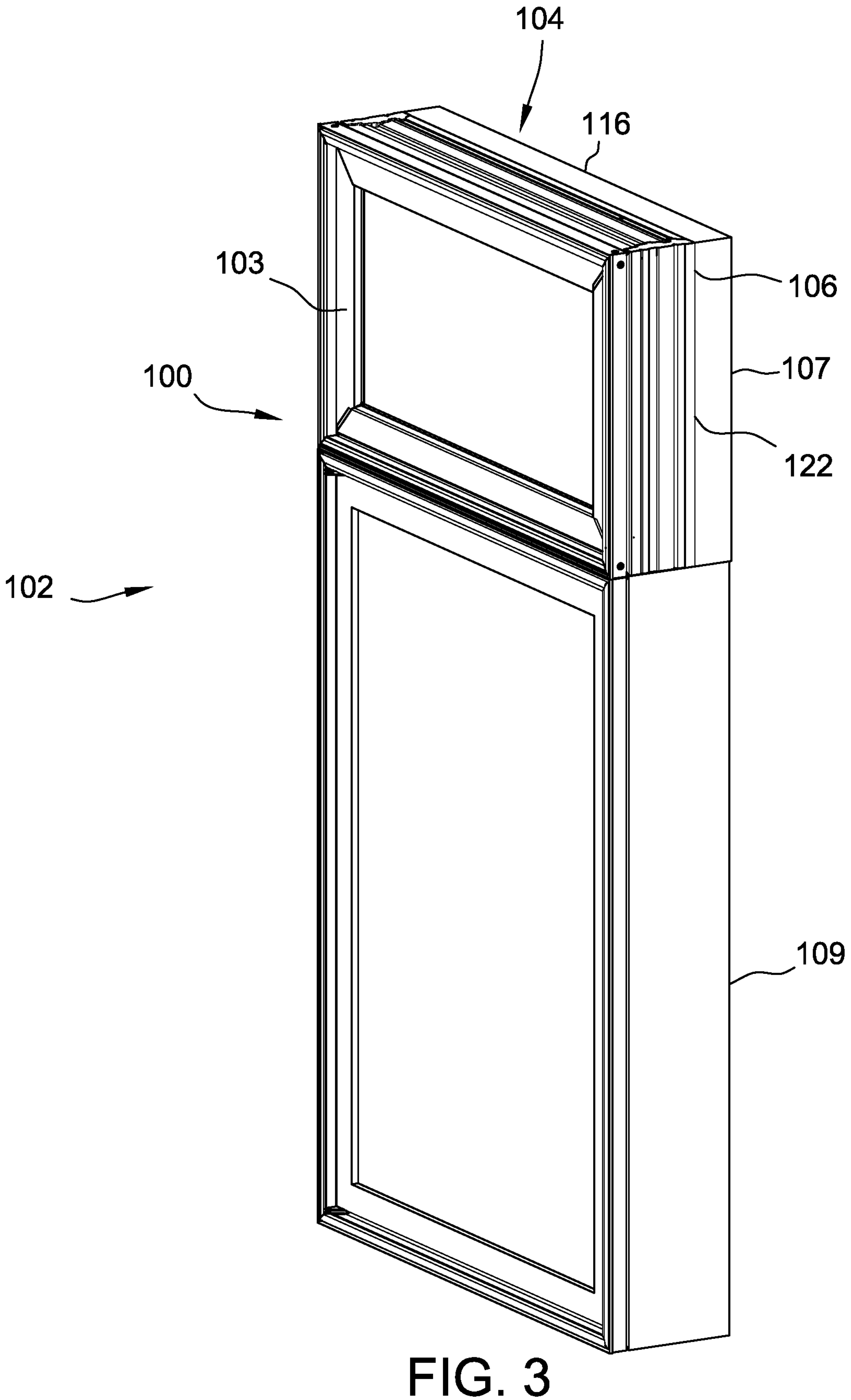
FIG. 3 is a front perspective view of the escape system in a closed position.

The escape system 100 may be modular and may be mounted above any window 102 that is suitable for egress. The window 102 may be moveable between a closed position (FIG. 3) and an open position (FIGS. 1 and 2). While the window 102 of the present disclosure may be shown and described herein as a casement window in which the sash assembly opens from the left or right, other types of windows may be used with the escape system 100. For example, a hung (single or double) window 102 may be used. The window 102 includes an egress opening 113 when it is in the open position. The escape system 100 and window 102 may together form an escape window system 101.

The fenestration unit 104 of the escape system 100 that is shown in FIGS. 1-4 includes fenestration 107 for the door 103. The fenestration unit 104 may also include fenestration 107 for the window 102 (e.g., the window system 101 includes additional fenestration 109 for the window opening 113).

The human support 108 enables a person to be supported during descent from the window 102 and may generally include any elements that allow the support 108 to function as described herein. In some example embodiments, the human support 108 may be a harness. The human support 108 may include, for example and without limitation, a waist buckle, a Bosun chair, and/or a climbing harness.

The escape system 100 includes a cable 112 that is wound about a shaft 120 (FIG. 2) supported by the frame 106. The cable 112 is connected to the human support 108. For example, the cable 112 may be connected to the human support 108 using hooks, fasteners, and/or latching mechanisms. In some embodiments, the escape system 100 may include a latching mechanism that allows the human support 108 to be selectively attached or detached from the cable 112. For example and without limitation, the human support 108 may be selectively detachable from the cable 112 using a carabineer. As such, a person may remove and/or reconnect the human support 108 to the cable 112. In other embodiments, the human support is fixedly connected (i.e., non-removably) to the cable 112.

The cable 112 may have any structure that enables it to support the forces of a person secured to the human support 108 during descent from the window 102. The cable 112 may include, for example, a braided rope, a steel wire core rope, and/or a climbing rope.

The frame 106 may include a head 116 and a sill 118. The sill 118 and the head 116 are parallel. The frame 106 further includes a first jamb 122 and a second jamb 124, parallel to each other, and extending perpendicularly between the sill 118 and the head 116.

The shaft 120 is rotationally coupled to the frame 106, such that the shaft 120 may rotate about a shaft axis $A_{120}$ (FIG. 5) relative to the frame 106. In the illustrated embodiment, the shaft 120 is mounted between the first jamb 122 and the second jamb 124 and the shaft axis $A_{120}$ is parallel to the head 116 and the sill 118.

At least a portion of the cable 112 is wound around the shaft 120. Rotation of the shaft 120 about the shaft axis $A_{120}$ in a first direction unwinds the cable 112 from the shaft 120. Likewise, rotation of the shaft 120 about the shaft axis $A_{120}$ in a second direction, opposite the first direction, rewinds the cable 112 about the shaft 120. As the cable 112 unwinds from the shaft 120, the human support 108, connected to the cable 112, moves away from the shaft 120, i.e., descends towards the ground. As the cable 112 rewinds about the shaft 120, the human support 108 connected to the cable 112 moves toward the shaft 120, i.e., ascends from the ground.

The escape system 100 includes a speed limiting device 130 connected to the shaft 120 to control the angular speed (also, referred to herein as rotational speed) of the shaft 120 and therefore control the speed of descent of the person. The speed limiting device 130 is supported by the frame 106 and is rotationally coupled to the shaft 120. The speed limiting device 130 is mounted to the frame 106 at either the first or second jamb 122, 124 and is in alignment with the shaft 120. In other embodiments, the speed limiting device 130 is mounted to the head 116. In some embodiments, the speed limiting device 130 is a non-powered speed limiting device that does not require supplied power for operation (e.g., a brake as described below).

The speed limiting device 130 may be a brake that applies a braking force that opposes the rotation of the shaft 120 in the first direction. For example, during a descent operation, a person connected to the human support 108 will experience gravitational acceleration and will increase in speed toward the ground. As the person accelerates towards the ground, the cable 112 unwinds from the shaft 120 thereby increasing the angular speed of the shaft 120. The braking force will oppose the angular speed of the shaft 120 and allow the person to reach the ground at a safer speed.

The escape system 100 further includes a release device 132 and a shelf 134. The shelf 134 is rotationally coupled to the fenestration unit 104 about a shelf axis $A_{134}$ (FIG. 5), generally parallel to the head 116 and sill 118. For example, the shelf 134 may include one or more hinges coupled to the frame 106, allowing the shelf 134 to rotate relative to the frame 106.

The shelf 134 includes a first plate 138 and a second plate 140 angled relative to the first plate 138. Before the release device 132 is activated (FIG. 4), the first plate 138 is upright (e.g., parallel to the plane of the frame 106) and the second plate 140, at least partially, extends over a portion of the sill 118. The human support 108 is positioned between the first plate 138 and a wall structure (not shown) such as a panel that covers the fenestration unit. In this position, the human support 108 is in a stowed position and is not accessible.

The human support 108 is released from the fenestration unit 104 when the release device 132 is activated. Specifically, the door 103 opens and the shelf 134 rotates away from the fenestration unit 104 upon activation of the release device 132. The shelf 134 moves the human support 108 from the stowed position to a lowered position as it rotates away from the fenestration unit 104.

In its lowered position, the human support 108 is vertically aligned with the window opening 113 upon rotation of the shelf 134. More specifically, when the release device 132 is activated, the shelf 134 rotates about the shelf axis $A_{134}$, outwardly, such that the first plate 138 extends outwardly from the fenestration frame 106. This causes the human support 108 to fall outward in front of the window opening 113. The cable 112 may drape over a front edge 111 of the first plate 138 such that the cable 112 and the human support 108 are positioned at a distance away from the plane of the frame 106. The first plate 138 has a length $L_{138}$ (FIG. 5) such that, during descent, a person supported by the human support 108 is positioned approximately the same distance $L_{138}$ away from the side of the building or home.

The front edge 111 of the first plate 138 of the shelf 134 may be made of a material that facilitates movement (i.e., sliding) of the cable 112 over the edge 111. For example, the front edge 111 may be made of a material that is different from the rest of the first plate 138 such as ultra-high molecular weight (UHMW) polyethylene or stainless steel.

After activation, the human support 108 may be suspended directly in front of the open window 102, allowing the person to grab a portion of the cable 112 and/or the human support 108 to bring the human support 108 through the egress opening 113 of the window 102 to allow the person to secure himself or herself to the human support 108.

The release device 132 may be mounted to the frame 106, for example, the release device 132 is mounted to the sill 118 and the window 102. The release device 132 prevents motion of the door 103 and shelf 134 until the release device 132 is activated. In this illustrated embodiment, the release device 132 includes a locking mechanism 135. The locking mechanism 135 includes a bracket 136 coupled to the window 102 and a pin 137 mounted to the sill 118. The bracket 136 includes a locking feature that engages with the pin 137 to retain the position of the shelf 134. The escape system 100 includes a biasing device 119 (FIG. 2; e.g., spring) that biases the door 103 toward the open position. Once the locking mechanism 135 is released, the door 103 swings open to allow the shelf 134 to rotate and release the human support 108.

Activating the release device 132 disengages the pin 137 from the bracket 136. For example, the pin 137 may be pushed or pulled to disengage the pin from the bracket 136. A portion of the pin 137 extends downward from the sill 118, such that a user may push or pull the pin 137 to activate the release device 132. After being disengaged from the pin 137, the bracket 136 moves with the door 103 when it is moved to the open position. In some other embodiments, the release device 132 is capable of being activated only when the window 102 is in the open position.

Generally, any release device 132 that enables the human support 108 to be lowered from its stowed position may be used. Other examples include levers, switches, knobs, handles, or other fasteners. In some other example embodiments, the shelf 134 may rotate such that the human support 108 is deployed inside the room upon activation of the release device.

The shaft 120 includes a winding groove 142 of the surface of the shaft 120. The cable 112 is wound about the shaft in the groove 142. For example, the groove 142 may be helical patterned groove that extends along the shaft axis $A_{120}$. The groove 142 is sized and shaped to receive at least a portion of the cable 112. As the cable 112 is wound around the shaft 120, the cable 112 engages the groove 142 and the cable 112 is rewound along the shaft axis $A_{120}$ within the groove 142. The groove 142 engages with the cable 112 and helps prevent the cable 112 from becoming tangled or wrapped over itself during rewinding. In alternative embodiments, the shaft 120 may include additional or alternative features that prevent the cable 112 from being tangled or wound over itself. In some embodiments, the shaft 120 does not include grooves (i.e., threads).

In some embodiments, the escape system 100 includes a cable guide nut 150. The cable guide nut 150 guides the cable 112 into the groove 142 on the shaft 120 to prevent over-wrapping of the cable 112 as it rewound on the shaft 120. The cable guide nut 150 also locates the cable 112 within the groove 142 when the cable 112 is slack and prevents skipping of adjacent grooves 142 during rewinding.

Figure 6:
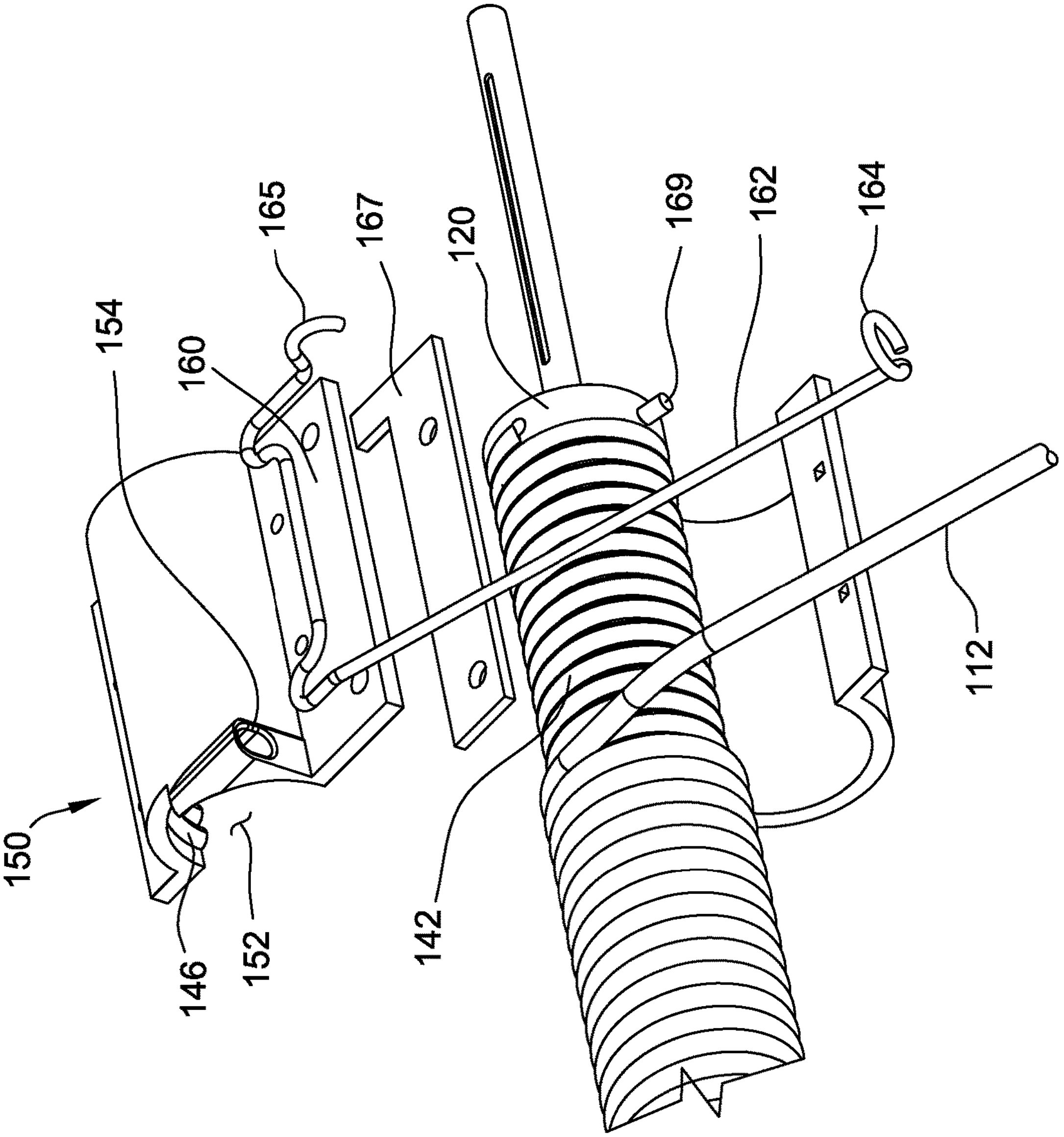
FIG. 6 is an exploded view of a cable guide nut and shaft for guiding a cable of the escape system.

Referring now to FIG. 6, the cable guide nut 150 includes a collar chamber 152 that is sized and shaped to receive at least a portion of the shaft 120 and/or the cable 112 wound about the shaft 120. The cable guide nut 150 includes a guide opening 154 that opens into the collar chamber 152 of the cable guide nut 150. The guide opening 154 is sized and shaped such that the cable 112 may pass through the guide opening 154 into the collar chamber 152 so that the cable 112 may be wound about the shaft 120 contained within the collar chamber 152. The guide opening 154 aligns the cable 112 within the groove 142 of the shaft 120. As the cable 112 rewinds about the screw patterned groove 142, the cable 112 rewinds along the shaft axis $A_{120}$ and the cable guide nut 150 translates along the shaft axis $A_{120}$ during rewinding.

Figure 7:
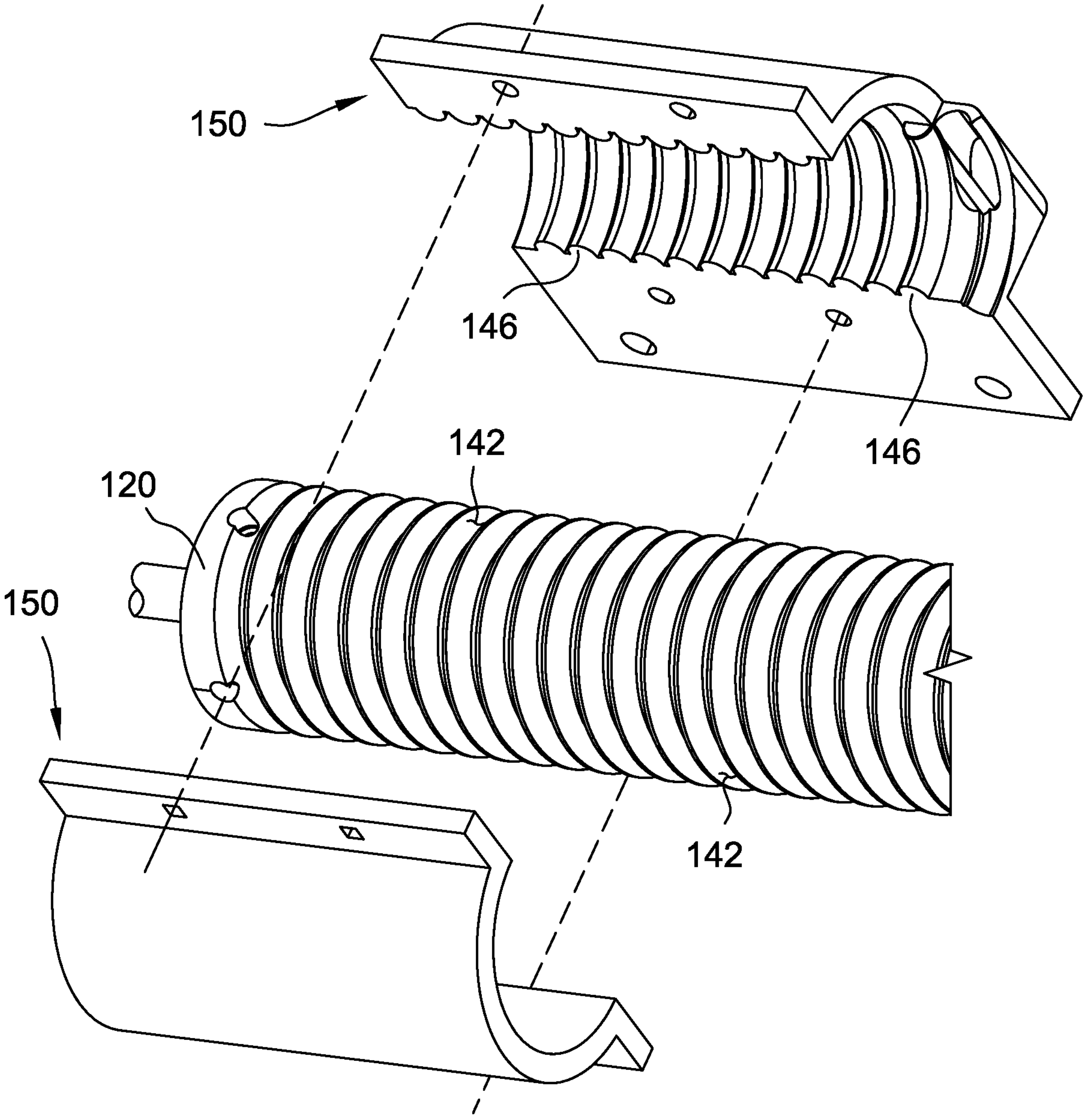
FIG. 7 is another exploded view of the cable guide nut and shaft.

The cable guide nut 150 may include bands 146 (FIG. 7) formed on an inner surface of the collar chamber 152. The bands 146 mate with the grooves 142 of the shaft 120 (i.e., fit within the grooves 142) such that rotation of the shaft 120 causes the guide nut 150 to translate along the shaft axis $A_{120}$ (i.e., similar to rotation of a bolt through a nut). The cable guide nut 150 may include bands 146 disposed on only a portion of the collar chamber 152 (e.g., upper half as shown) to reduce friction. In other embodiments, the bands 146 extend over the entire circumference of the collar chamber 152. The cable guide nut 150 may include fewer bands 146 than in the illustrated embodiment (e.g., one or more bands) that mate with the grooves 142 of the shaft 120.

The cable guide nut 150 may include a mounting bracket 160 that supports a guide member 162 that extends from the cable guide nut 150. The guide member 162 includes a guide eyelet 164. The guide eyelet 164 is disposed outward from the cable guide nut 150. During rewinding of the cable 112, the cable 112 passes over the front edge 111 of the first plate 138 of the shelf 134, through the guide eyelet 164, and then from the guide eyelet 164 to the guide opening 154 and onto the groove of the rotating shaft 120. The escape system 100 may include additional or alternative features that align the cable 112 with the groove 142 on the shaft 120 when the cable 112 is rewound. The guide member 162 prevents the guide nut 150 from rotating with the shaft 120.

The cable guide nut 150 also includes a kicker arm 165 that extends outward from the guide member 162. The kicker arm 165 presses against the first plate 138 of the shelf 134 when in the stowed position and pushes the shelf 134 to cause it to rotate when the release device 132 is activated.

Figure 5:
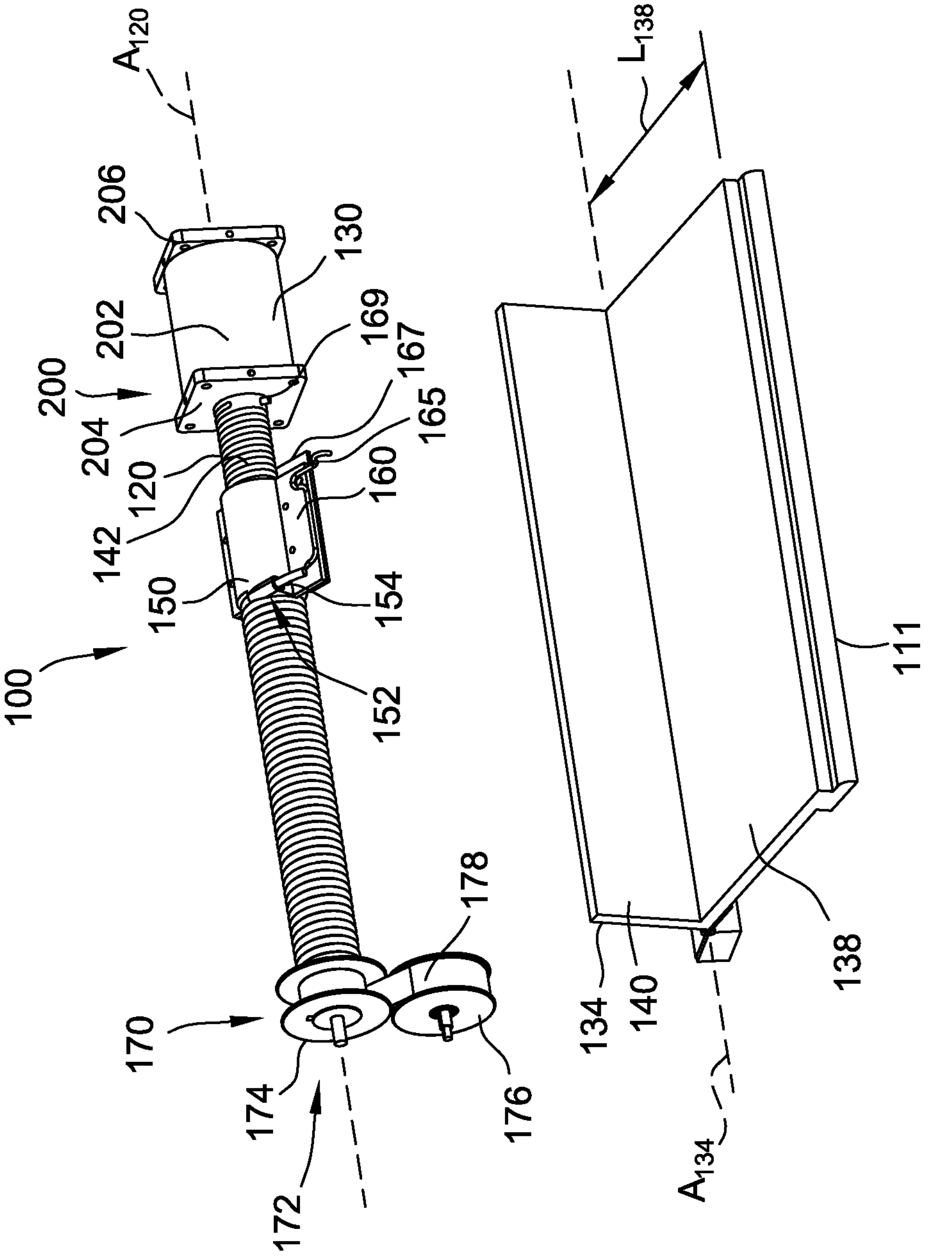
FIG. 5 is a front view of the escape system in the open position with the window and fenestration unit not shown.

The cable guide nut 150 also includes a stop plate 167 that partially extends from the mounting bracket 160 (i.e., extends toward the speed limiting device 130 as shown in FIG. 5). The shaft 120 includes a pin 169 that protrudes from the shaft 120. In the stowed position of the human support 108 (FIG. 3), the rewind spring 172 (which is further discussed below) causes the pin 169 to push against the stop plate 167. This causes the kicker arm 165 to push against the shelf 134 and for the shelf to rotate outward once the release device 132 is activated. When the cable 112 is completely or nearly completely rewound about the shaft 120, the stop plate 167 comes into contact with the pin 169, preventing further winding of the cable 112 and resisting the motion of the cable guide nut 150 relative to the shaft 120.

During descent of the human support 108, the cable 112 unwinds from the groove 142 of the shaft 120 along shaft axis $A_{120}$ such that the human support 108 and the person also translate in a lateral direction while descending. The front edge 111 (FIG. 1) of the first plate 138 is rounded which allows the cable 112 to glide over and/or slide along the front edge 111 of the first plate 138 during a descent operation.

In other example embodiments, the shelf 134 may include additional or alternative features that guide or align the cable 112. For example, the shelf 134 may include features and/or guides that ensure that the cable 112 drapes over the front edge 111 of the first plate 138 (i.e., does not fall off the sides of the first plate 138) during a descending operation.

The escape system 100 includes a speed limiting device 130 (FIG. 5) for regulating the descent of the support 108 and person lowered by the system 100. In some embodiments, the speed limiting device 130 is non-powered. In the illustrated embodiment, the speed limiting device 130 is a brake 200.

In some embodiments, the brake 200 is an embodiment of the adaptive brake described in U.S. Provisional Patent Application No. 62/873,331, filed Jul. 12, 2019 entitled "Adaptive Centrifugal Brake Assemblies," which is incorporated herein by reference for all relevant and consistent purposes.

Figure 4:
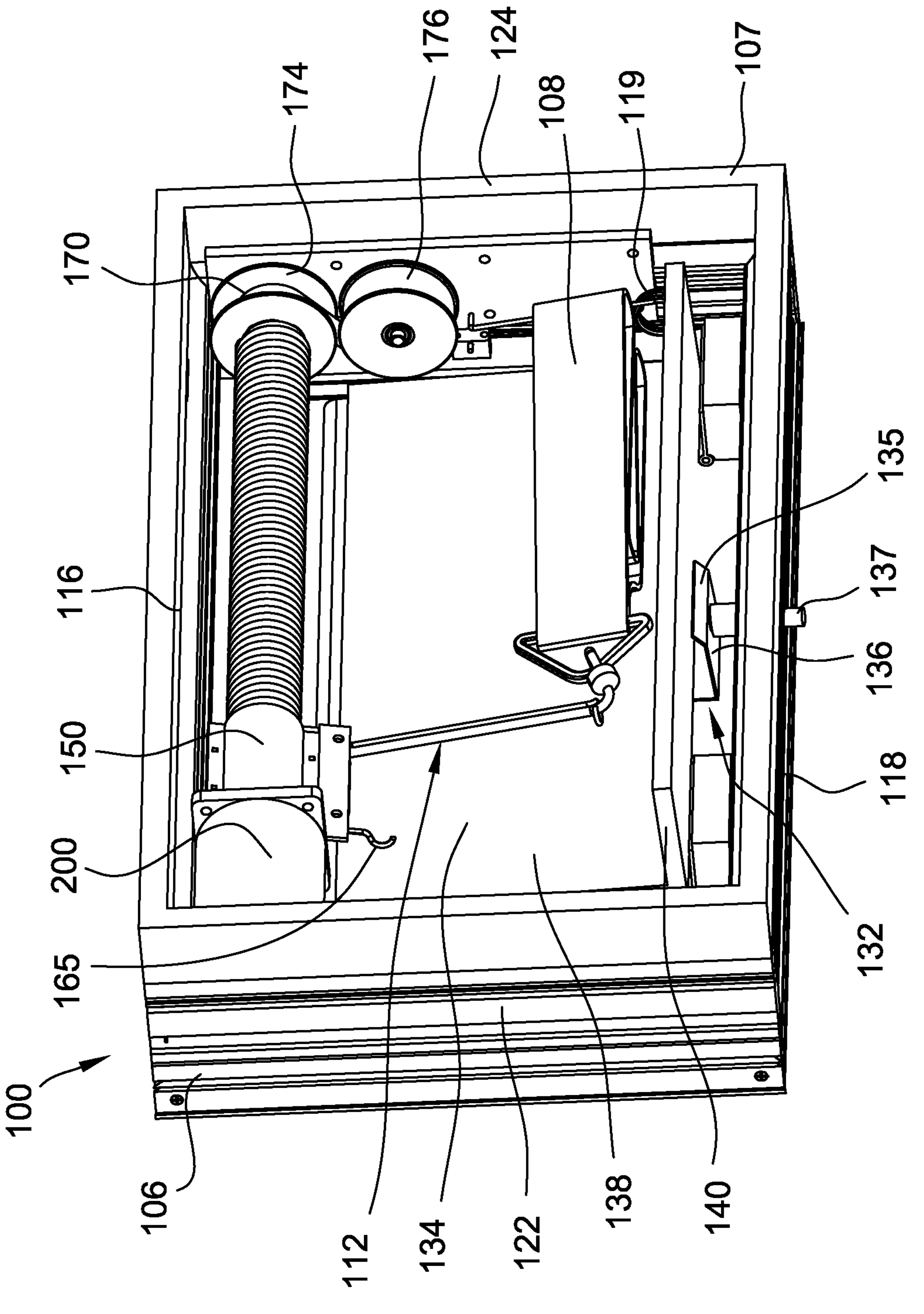
FIG. 4 is a rear view of the escape system in the closed position with a rear cover removed.
Figure 8:
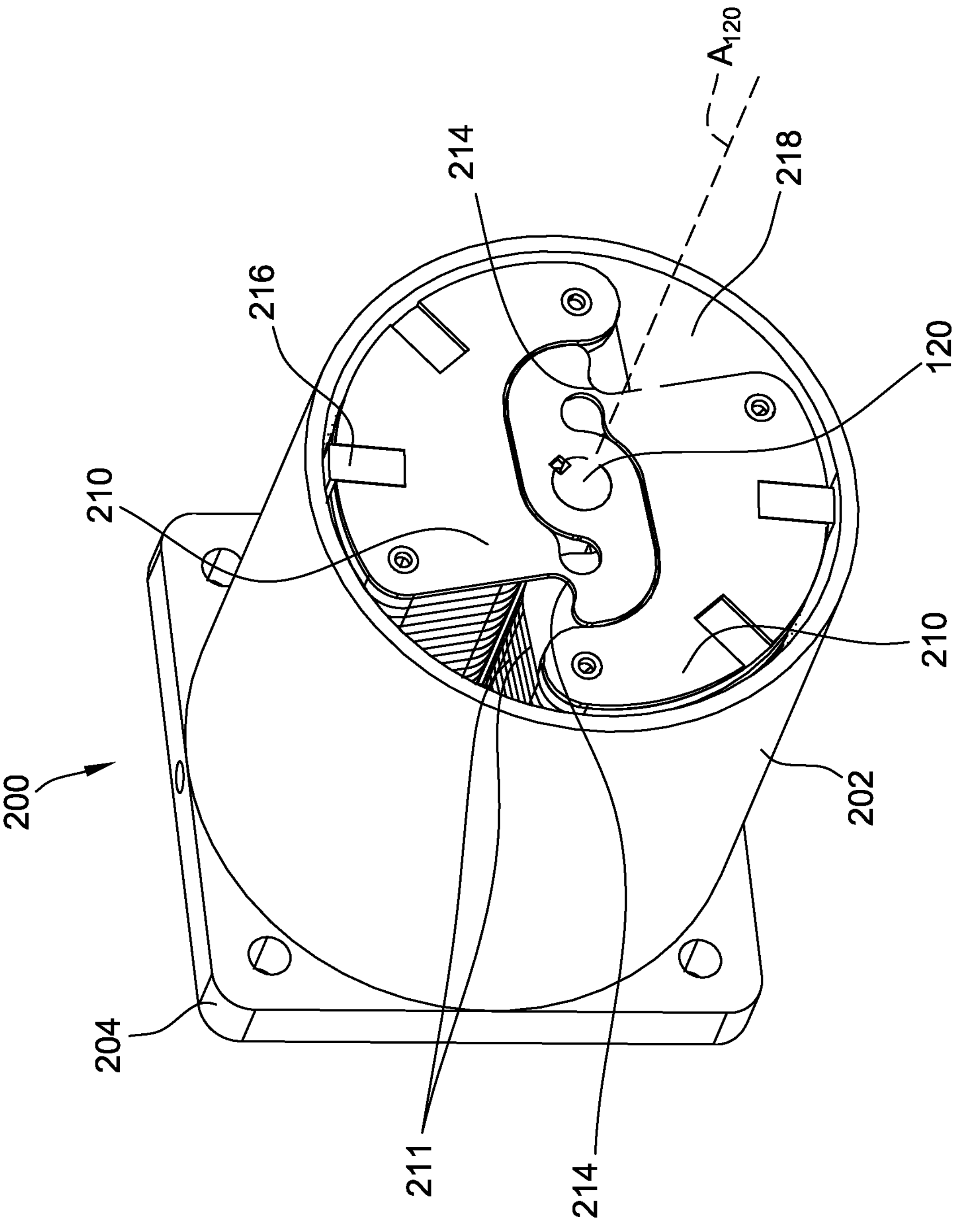
FIG. 8 is an embodiment of a speed limiting device, shown as a brake, for limiting the speed of descent of the escape system.

Another embodiment of the brake 200 is shown in FIG. 8 (e.g., non-adaptive brake). The brake 200 includes a drum 202 and a first and a second end cap 204, 206 (FIG. 4). Each end cap may be used to support the drum 202 and enable the brake 200 to be mounted to the frame 106. A portion of the shaft 120 extends into the brake 200. The brake further includes flyweights 210 and one or more flexing pivots 214. The center hub 208, the flyweights 210, and the flexing pivots 214 are disposed within the drum 202. As the shaft rotates, the drum 202 is stationary relative to the flyweights 210. As illustrated, the flyweights 210 are a stack of steel laminations 211 that are riveted into a single unit. In other example embodiments, the flyweights may be formed of a single part. At least one or more of the laminations 211 are keyed into the center hub 208.

One or more friction members 216 are connected to the flyweights 210. The drum 202 includes an inner surface 218. The friction members 216 are in contact with the inner surface of the drum 202 as the center hub 208 rotates.

Rotation of the shaft 120 about the shaft axis $A_{120}$ causes the flyweights 210 to rotate. Each of the flexing pivots 214 allows the flyweights 210 to deflect outward, toward the inner surface 218 of the drum 202. The flexing pivots 214 may act as springs that enable the flyweight 210 and friction members 216 to be pulled away from the inner surface 218 of the drum 202 when the center hub 208 is turning a slower speed. When the drum 202 is rotating at higher speeds, rotation of the flyweights 210 moves the flyweights 210 further outward toward the inner surface 218 of the drum 202. This forces the friction members 216 into contact with the inner surface 218 of the drum 202.

The contact force between the friction members 216 and the inner surface of the drum 202 creates the braking force that opposes the rotation of the center hub 208 and the shaft 120. The braking force is related to the contact force which varies based on the rotation of the flyweights 210 which is related to both rotation of the shaft 120 and the flexing pivots 214 force.

In another embodiment, the brake 200 is a disk brake. In yet other embodiments, the speed limiting device 130 is powered (i.e., motorized lowering and/or raising of the human support 108).

The escape system 100 includes a lifting device 170 (FIG. 5) for raising the human support 108 after its descent (e.g., non-powered lifting device). The lifting device 170 may be coupled to the shaft 120 such that the lifting device 170 may be used to rotate the shaft 120 in the direction opposite that of the descent to rewind the cable 112 about the shaft 120.

In some embodiments, the lifting device 170 is a rewind spring 172. The rewind spring 172 may include a first spool 174, a second spool 176, and a ribbon spring 178 connected between the first spool 174 and the second spool 176. The first spool 174 may be coupled to the shaft 120 such that the shaft rotates upon rotation of the first spool 174. The second spool 176 may be rotationally coupled to the frame 106.

As the shaft 120 rotates in the first direction, i.e., as the person is descending and the cable 112 is unwound from the shaft 120, the ribbon spring 178 becomes uncoiled from the second spool 176 and coils about the first spool 174. The uncoiling of the ribbon spring 178 from the second spool 176 increases the tension in the ribbon spring 178. The increase in tension of the ribbon spring 178 opposes the rotation of the first spool 174 and the shaft 120 in the first direction.

The tension of the ribbon spring 178 opposing the rotation of the shaft 120 in the first direction is not sufficient to resist the rotation of the shaft 120 that results from a torque applied to the shaft 120 by the combined weight of the person descending, the weight of the human support 108, and/or the weight of the cable 112. In other words, the tension in the ribbon spring 178 does not prevent the rotation of the shaft 120 in the first direction while a person is descending.

Without the weight of the person, i.e., the person has reached the ground and removed the human support 108, the tension in the spring is sufficient to rotate the shaft 120 in the second direction when the torque on the shaft 120 only includes the weight of the human support 108 and/or the weight of the cable 112.

In some example embodiments, the rewind spring 172 may be used to hold the human support 108 near the same vertical position as the fenestration unit 104. For example, after the person activates the release device 132 and the human support 108 is positioned to a lower position, the rewind spring 172 may prevent the human support 108 from descending to the ground. The rewind spring 172 holds the position of the human support 108 such that the person is able to reach out of the window 102 to retrieve the human support 108 for use.

The tension stored in the rewind spring 172 may also be used to rotate the shelf 134 to deploy the human support 108. When the human support is in the stowed position, the cable 112 is completely or almost completely rewound about the shaft 120 with the cable guide nut 150 being positioned such that the stop plate 167 is engaged with the pin 169. Contact between the stop plate 167 and pin 169 prevents further rewinding of the cable 112. When the human support 108 is in the stowed position, the window 102 is closed, and the first plate 138 of the shelf 134 is in a generally vertical position. After the window 102 is opened, and the release device 132 activated, the tension stored in the rewind spring 172 causes the shaft 120 and the cable guide nut 150 to begin to rotate. The rotation of the cable guide nut 150 moves the kicker arm 165 into contact with the first plate 138, moving the first plate 138 forward causing the shelf 134 to rotate forward and for the human support 108 to fall from its stowed position (FIG. 4) to its lowered position (FIG. 1) in which the harness is accessible. Upon descent of a person, the rewind spring stores energy to enable the human support 108 to be raised.

To descend from the window 102, the window 102 is opened. The release device 132 is activated (e.g., the person presses or pulls a plunger) to cause the human support 108 stowed in the fenestration unit 104 to be deployed and lowered from within the fenestration unit 104. The stored energy in the rewind spring 172 causes the shaft 120 and pin 169 that protrudes from the shaft 120 to rotate an amount. The pin 169 pushes against the stop plate 167. This causes the kicker arm 165 to push the first plate 138 of the shelf 134 forward causing the shelf 134 to rotate. The shelf 134 rotates away from the fenestration unit 104 and moves the human support 108 from the stowed positon to the lowered position that is vertically aligned with the open window 102 (FIG. 1).

The human support 108 is pulled through the window 102 and into the room. The person is then secured to the human support 108. For example, if the human support 108 includes a harness, the person may attach the harness around their body.

After the person is secured to the human support 108, the person may climb out of and/or step through the open window 102, to begin descent. The weight of the person, secured to the harness, uncoils the cable 112 from the shaft 120 causing the shaft 120 to rotate about the shaft axis $A_{120}$ in the first direction.

As the person descends, the person experiences gravitational acceleration which increases the speed of descent of the person, thereby increasing the rotational speed of the shaft 120. The brake 200 applies a braking force to the rotational speed of the shaft 120. The braking force opposes the rotation of the shaft 120 in the first direction. Specifically, the brake 200 increases the braking force to restrict the increasing rotational speed of the shaft 120, limiting the descent speed of the person. The limited descent speed allows the person to reach the ground and land at a controlled speed.

The person may take off and/or remove the human support 108 while the human support 108 is still connected to the cable 112. The lifting device 170 raises the human support 108 back to the fenestration unit 104 allowing a second person to escape the building in the same manner as the first person. More specifically, when the cable 112 is no longer supporting the weight of the person, i.e., the cable 112 is only supporting the weight of the human support 108, the lifting device 170 raises the human support 108 by rotating the shaft 120 in the second direction. The lifting device 170 rotates the shaft 120 in the second direction causing the cable 112 to pass through the guide eyelet 164, through the guide opening 154 into the cable guide nut 150 and wrap around the shaft 120 along the shaft axis $A_{120}$ within the groove 142. The escape system 100 may be used any number of times to allow a plurality of persons to escape the building using the escape system 100.

Compared to conventional escape systems, the escape system of the present disclosure has several advantages. The human support (e.g., harness) is stowed away when not used. Upon activation of the release device, the human support is lowered from the fenestration unit and is accessible by a user through the open window. In embodiments in which the escape system includes a brake, the brake controls the speed of descent of a person, allowing the person to descend at a safer descent speed. The brake is also non-powered which allows the system to operate without a power source and allows the system to be less complex. In embodiments in which the escape system includes a lifting device, the lifting device returns the human support to the window allowing one or more additional persons to escape (i.e., multiple uses). The escape system is adapted to help manage the cable while the human support is returned to the window. The escape system allows persons to be lowered to the ground with relative ease (e.g., compared to rope ladder systems which may be difficult to climb down).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. An escape system for descending a person from a window disposed below the escape system, the escape system comprising:

a fenestration unit having a frame;

a human support embedded into the frame in a stowed position, the human support configured to carry a person during descent;

a cable that is wound about a shaft supported by the frame, the cable being connected to the human support;

a speed limiting device connected to the shaft for controlling the speed of descent of the human support;

a release device, the human support being released from the fenestration unit when the release device is activated;

a door that covers an opening defined by the frame, the door rotating to an open position upon activation of the release device;

a biasing device that biases the door toward an open position; and a shelf that rotates through the opening and away from the fenestration unit upon activation of the release device, the shelf rotating about a shelf axis, the shelf moving the human support from the stowed position to a lowered position as it rotates away from the fenestration unit, the shelf axis being disposed below the human support when the human support is in the stowed position.

2. The escape system as set forth in claim 1 wherein the speed limiting device is non-powered.

3. The escape system as set forth in claim 2 wherein the speed limiting device is a brake.

4. The escape system as set forth in claim 1 comprising a non-powered lifting device for raising the human support after its descent.

5. The escape system as set forth in claim 4 wherein the lifting device is a rewind spring.

6. The escape system as set forth in claim 1 wherein the shaft includes a helical groove on its surface and the cable is wound about the helical groove.

7. An escape window system comprising:

a fenestration unit having a frame;

a human support configured to carry a person during descent;

a cable that is wound about a shaft, the cable being connected to the human support;

a non-powered speed limiting device connected to the shaft for controlling the speed of descent of the human support;

a door that covers an opening defined by the frame;

a window moveable between a closed position and an open position, the window having an egress opening in the open position, the opening defined by the frame being disposed directly above the egress opening; and a shelf rotatable away from the fenestration unit, the shelf rotating about a shelf axis, the shelf moving the human support from a stowed position to a lowered position as it rotates away from the fenestration unit, the cable draping over a front edge of the shelf in the lowered position to laterally space the human support from the frame, the shelf axis being disposed below the human support when the human support is in the stowed position.

8. The escape system as set forth in claim 7 wherein the speed limiting device is a friction brake comprising:

a stationary drum;

flyweights disposed within the drum, the flyweights deflecting outward toward the drum during rotation of the flyweights; and friction members connected to the flyweights, the friction members contacting an inner surface of the drum as the flyweights deflect outwards.

9. An escape window system comprising:

a fenestration unit comprising door fenestration and window fenestration and having a frame, the door fenestration being disposed directly above the window fenestration;

a human support configured to carry a person during descent, the human support being disposed within the door fenestration when the human support is in a stowed position;

a cable connected to the human support for lowering the human support from the fenestration unit;

a speed limiting device for controlling the speed of descent of the human support;

a window disposed within the window fenestration, the window being moveable between a closed position and an open position, the window having an egress opening in the open position;

a release device, the human support being lowered from the fenestration unit when the release device is activated such that the human support is vertically aligned with the egress opening;

a door that covers an opening defined by the frame; and a shelf that rotates away from the fenestration unit upon activation of the release device, the shelf moving the human support from the stowed position to a lowered position as it rotates away from the fenestration unit, the shelf being disposed above the window when the human support is in the stowed position, the shelf enabling the human support to be spaced a distance away from the window when the human support is in the lowered position.

10. The escape window system as set forth in claim 9 wherein the release device is capable of being activated only when the window is in the open position.

11. The escape window system as set forth in claim 9 wherein the release device is a button, lever, switch, knob, handle or fastener.

12. The escape window system as set forth in claim 9 wherein the speed limiting device is non-powered.

13. The escape window system as set forth in claim 9 comprising a non-powered lifting device for raising the human support after its descent.

14. The escape window system as set forth in claim 9 wherein the cable drapes over a front edge of the shelf in the lowered position to space the human support from the window.

* * * * *